US012291286B2

(12) United States Patent
Sams

(10) Patent No.: US 12,291,286 B2
(45) Date of Patent: May 6, 2025

(54) TIRE COOLING SYSTEMS AS WELL AS VEHICLES AND METHODS INCLUDING SAME

(71) Applicant: Bridgestone Americas Tire Operations, LLC, Nashville, TN (US)

(72) Inventor: Thomas A. Sams, Hartville, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 374 days.

(21) Appl. No.: 18/150,060

(22) Filed: Jan. 4, 2023

(65) Prior Publication Data

US 2023/0219641 A1 Jul. 13, 2023

Related U.S. Application Data

(60) Provisional application No. 63/296,972, filed on Jan. 6, 2022.

(51) Int. Cl.
*B60C 23/19* (2006.01)
*B62D 35/00* (2006.01)

(52) U.S. Cl.
CPC ............ *B62D 35/008* (2013.01); *B60C 23/19* (2013.01)

(58) Field of Classification Search
CPC ....... B60C 23/18; B60C 23/19; B62D 35/001; B62D 35/008; B62D 35/02
USPC ................................ 296/180.1, 180.2, 180.4
See application file for complete search history.

(56) References Cited

U.S. PATENT DOCUMENTS

| 6,921,197 | B2 | 7/2005 | Aubel et al. |
| 7,320,246 | B2 | 1/2008 | Schick et al. |
| 7,461,713 | B2 | 12/2008 | Kojima |
| 8,562,023 | B2 | 10/2013 | Hino |
| 8,988,208 | B2 | 3/2015 | Carson |
| 9,104,210 | B2 | 8/2015 | Okubo |
| 10,315,579 | B2 * | 6/2019 | Gaylard ................. B62D 35/02 |
| 10,518,827 | B2 * | 12/2019 | Ibañez ................... B62D 35/00 |
| 10,759,237 | B2 | 9/2020 | Alhammadi et al. |
| 2017/0299006 | A1 * | 10/2017 | Shi ........................ F16D 65/847 |

(Continued)

FOREIGN PATENT DOCUMENTS

| CN | 206704172 U | 12/2017 |
| CN | 211869086 U | 11/2020 |
| DE | 102012105157 | 12/2013 |

(Continued)

*Primary Examiner* — Jason S Daniels

(57) ABSTRACT

Tire cooling systems operatively disposed along a vehicle body adjacent a vehicle tire include a deflector panel displaceable between retracted and deployed positions. In the retracted position, a first nominal volume of air flows along the vehicle tire during operation. In the deployed position, a second nominal volume of air that is greater than the first nominal volume of air is directed along the vehicle tire. An actuator is selectively operable to displace the deflector panel between the retracted and deployed positions. A sensor registers data having a relation to a physical characteristic or health condition of the vehicle tire. A controller executes instructions to determine using the data whether or not the physical characteristic of the vehicle tire exceeds a predetermined threshold as well as control displacement of the deflector panel. Vehicles including tire cooling systems and method of operation are also included.

20 Claims, 6 Drawing Sheets

(56) References Cited

U.S. PATENT DOCUMENTS

2019/0031160 A1    1/2019  McMillan et al.
2021/0197902 A1*   7/2021  Butler .................. B62D 35/001

FOREIGN PATENT DOCUMENTS

| DE | 102009034518 B4 | * | 8/2024  | ............. B62D 35/00 |
| GB | 2513541 A       | * | 11/2014 | ........... B62D 35/002 |
| JP | H07290916 A     |   | 11/1995 | |
| KR | 20150122420 B1  |   | 5/2016  | |
| WO | WO-2017129358 A1 | * | 8/2017 | ........... B62D 35/005 |
| WO | WO-2018084823 A1 |   | 5/2018 | |

* cited by examiner

TIRE COOLING SYSTEMS AS WELL AS VEHICLES AND METHODS INCLUDING SAME

This application claims the benefit of priority from U.S. Provisional Patent Application No. 63/296,972, filed on Jan. 6, 2022, the entire contents of which is hereby incorporated herein by reference.

BACKGROUND

The subject matter of the present disclosure broadly relates to the art of wheeled vehicles and, more particularly, to systems for cooling vehicle tires that include selectively deployable deflector panels. Vehicles including such systems as well as methods of operation are also included.

As is well known in the art, the walls and/or wall portions of pneumatic tires continuously flex and recover as the pneumatic tires rotate during use over roadways and other ground surfaces. Such continuous flexing and recovering of the tire material generates heat and increases the temperature of the tire. Heat from roadway and other environmental sources can also increase the operating temperature of tire during use. Conventional pneumatic tires are designed by the manufacturer to operate within predetermined temperature range during normal conditions of use, which include operation of the pneumatic tire at an inflation pressure falling within a predetermined pressure range determined by the manufacturer as well as at or below a maximum load.

It is well understood that vehicle tires experience convective cooling from air flowing past the tires during travel over roadways. Such convective cooling is effective in maintaining tire temperatures within predetermined temperature range established by the manufacturer during normal conditions of use. Such convective cooling also aids in reducing excess heat build-up in pneumatic tires under conditions of use exceeding those specified by the manufacturer, such as operation in an underinflated condition and/or operating the tires under excessive load.

In an effort to improve fuel economy and/or vehicle range, manufacturers continue to pursue increases in aerodynamic efficiency though the shape of vehicle bodies. Additionally, vehicle owners often pursue increases in aerodynamic efficiency, particularly on older vehicles, through the purchase and installation of aftermarket kits and components that alter and/or improve the aerodynamic shape and/or profile of vehicles. Similar efforts continue to be undertaken in connection with trailers, such as over-the-road freight trailers used in connection with tractor-trailer vehicles, for example. As a result of such aerodynamic improvements, it has been observed that—in some cases—less air may flow along or across the pneumatic tires of the vehicle. In such cases, convective cooling from the airflow can be reduced and/or may be less effective in maintaining tire temperatures within predetermined temperature ranges established by the manufacturer, whether such use is under normal operating conditions or under conditions outside those recommended by the tire manufacturer.

Accordingly, it is believed desirable to develop systems and methods of operation that may aid in overcoming the foregoing and/or other disadvantages of known vehicle constructions and/or configurations, and/or otherwise advance the art of wheeled vehicles.

BRIEF DESCRIPTION

One example of a tire cooling system in accordance with the subject matter of the present disclosure can be operatively disposed along an associated vehicle body adjacent an associated vehicle tire. The tire cooling system can include a deflector panel displaceable between a retracted position and a deployed position. In the retracted position, a first nominal volume of air flows along the associated vehicle tire during movement of the associated vehicle at a given rate of travel. In the deployed position, a second nominal volume of air is directed along the associated vehicle tire during movement of the associated vehicle at the given rate of travel such that the total volume of air flowing along or across the associated vehicle tire is greater than the first nominal volume of air. An actuator can be operatively connected to the deflector panel and operable to displace the deflector panel between the retracted and deployed positions. A first sensor can be configured to register data having a relation to a physical characteristic of the associated vehicle tire. A processor can be communicatively coupled with a memory, the actuator and the first sensor with the memory including instructions to determine, based at least in part on the data, that the physical characteristic of the associated vehicle tire is one of a) equal to or greater than a first threshold value and b) less than the first threshold value. The memory also includes instructions to initiate displacement of the deflector panel from the first position to the second position thereby increasing airflow along or around the associated vehicle tire from the first nominal volume of airflow to an amount greater than the first nominal volume of airflow, such as an amount of the second nominal volume of airflow or greater.

One example of a vehicle in accordance with the subject matter of the present disclosure can include a vehicle body that includes a wheel well and an aerodynamic profile extending along the vehicle body and across the wheel well. A wheel can include a tire dimensioned to engage a ground surface. The wheel can be disposed within the wheel well of the vehicle body and inside the aerodynamic profile such that a first nominal volume of air flows along the wheel during movement of the vehicle at a given rate of travel. A deflector panel can be disposed along the vehicle body adjacent the wheel well. The deflector panel can be displaceable between a first position and a second position. In the first position, the deflector panel is substantially-entirely disposed within the aerodynamic profile of the vehicle body with the first nominal volume of air flowing along the wheel during movement of the vehicle at the given rate of travel. In the second position, the deflector panel projects outwardly beyond the vehicle body into the aerodynamic profile of the vehicle body such that a second nominal volume of air flows along the wheel during movement of the vehicle at the given rate of travel. The second nominal volume of air flow is greater than the first nominal volume of airflow thereby increasing convective heat transfer out of the tire.

One example of a method of cooling a vehicle tire in accordance with the subject matter of the present disclosure can be performed in association with a vehicle that includes a vehicle body and a wheel that includes the vehicle tire. The vehicle body can include a wheel well and an aerodynamic profile extending along the vehicle body and across the wheel well. The wheel can be disposed within the wheel well of the vehicle body and inside the aerodynamic profile such that a first nominal volume of air flows along the wheel during movement of the vehicle at a given rate of travel. The first nominal volume of air flowing along the wheel during movement of the vehicle at the given rate of travel can have a relation to a first nominal convective heat transfer from the vehicle tire. The method can include supporting a deflector panel on the vehicle body adjacent the wheel well such that the deflector panel is displaceable between a first position and a second position. In the first position, the deflector panel is substantially-entirely disposed within the aerodynamic profile of the vehicle body with the first nominal volume of air flowing along the wheel during movement of the vehicle at the given rate of travel. In the second position, the deflector panel projects outwardly beyond the aerodynamic profile of the vehicle body such that a second nominal volume of air that is greater than the first nominal volume of air flows along the wheel during movement of the vehicle at the given rate of travel. The second nominal volume of air flowing along the wheel during movement of the vehicle at the given rate of travel can have a relation to a second nominal convective heat transfer from the vehicle tire that is greater than the first nominal convective heat transfer. The method can also include acquiring data having a relation to a physical characteristic of the vehicle tire. The method can further include determining, based at least in part on the data, that the physical characteristic of the tire is one of a) equal to or greater than a first threshold value and b) less than the first threshold value. The method can further include initiating displacement of the deflector panel from the first position to the second position thereby increasing airflow along the wheel from the first nominal volume of airflow to the second nominal volume of airflow and generating a corresponding increase in convective heat transfer from the vehicle tire.

DETAILED DESCRIPTION

Turning now to the drawings, it is to be understood that the drawings are for purposes of illustrating examples of the subject matter of the present disclosure and that such examples are not to be interpreted as limiting. Additionally, it will be appreciated that the drawings are not to scale and that portions of certain features and/or elements may be exaggerated for purposes of clarity and/or ease of understanding.

Figure 1:
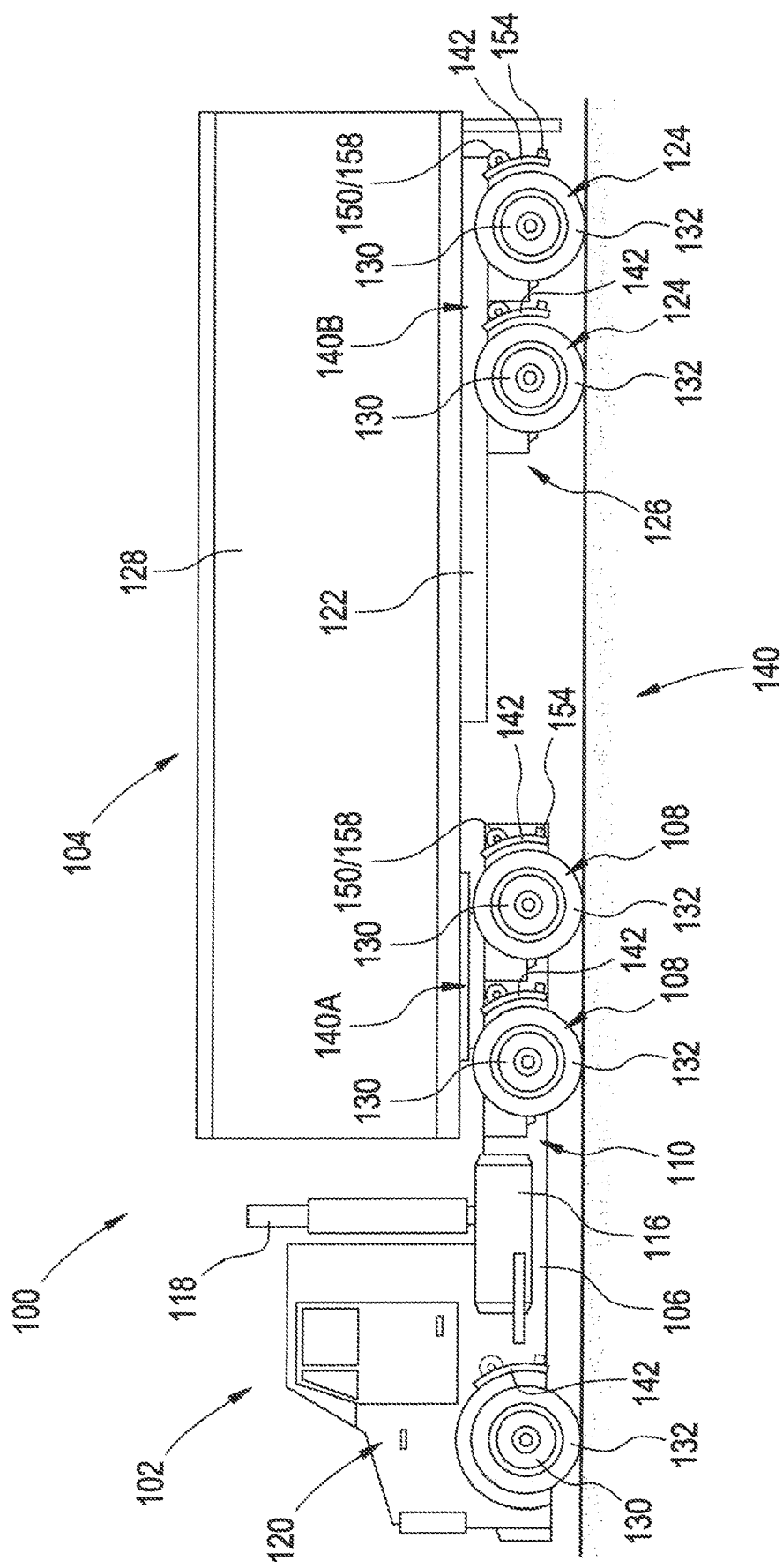
FIG. 1 is a graphical representation of one example of a vehicle including a tire cooling system in accordance with the subject matter of the present disclosure.
Figure 2:
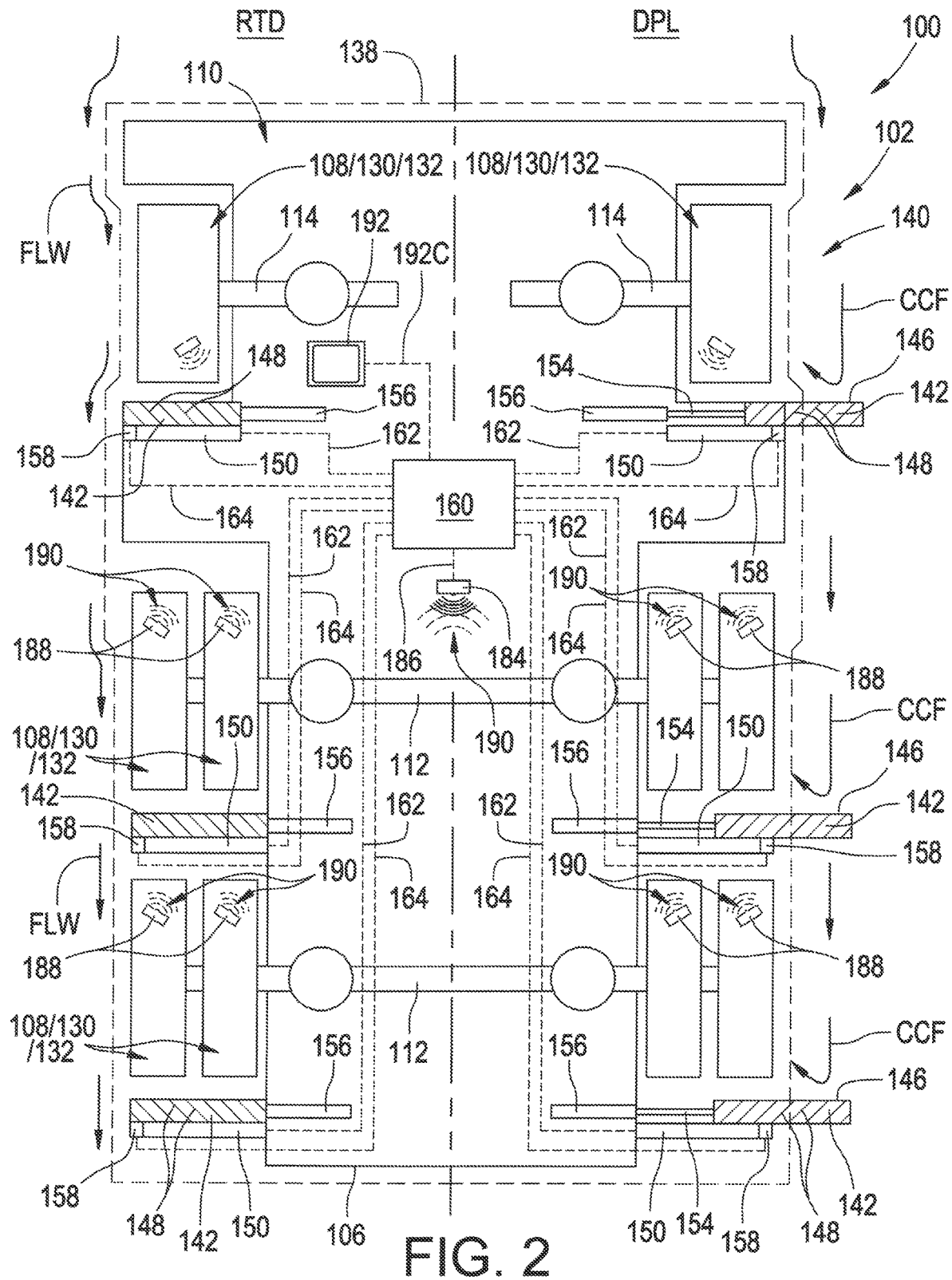
FIG. 2 is a greatly simplified schematic representation of an exemplary vehicle including a tire cooling system in accordance with the subject matter of the present disclosure, such as is shown in FIG. 1, for example, that includes electrically-operable linear actuators.
Figure 3:
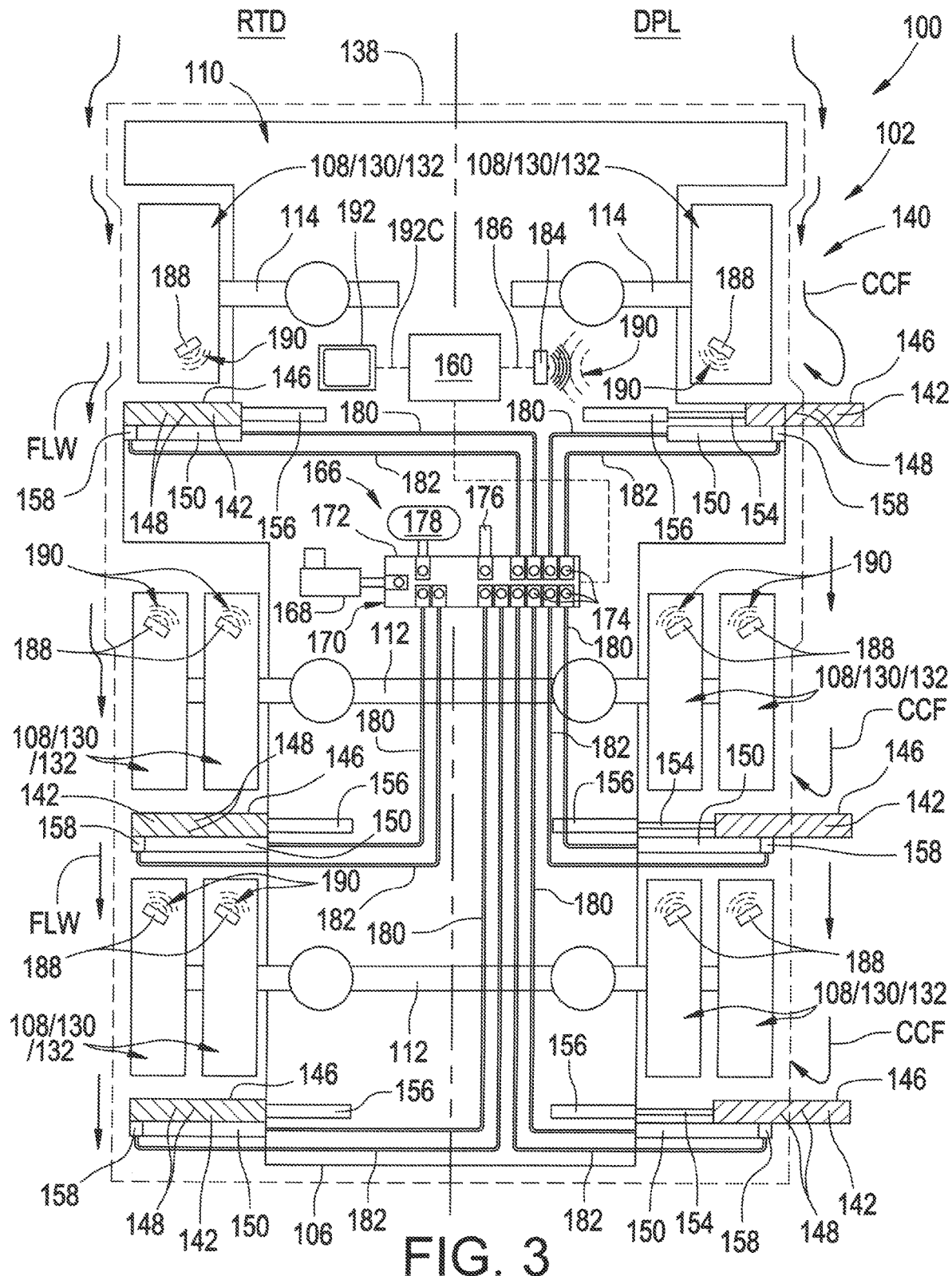
FIG. 3 is a greatly simplified schematic representation of an exemplary vehicle including a tire cooling system in accordance with the subject matter of the present disclosure, such as is shown in FIG. 1, for example, that includes pneumatically-operable linear actuators.
Figure 4:
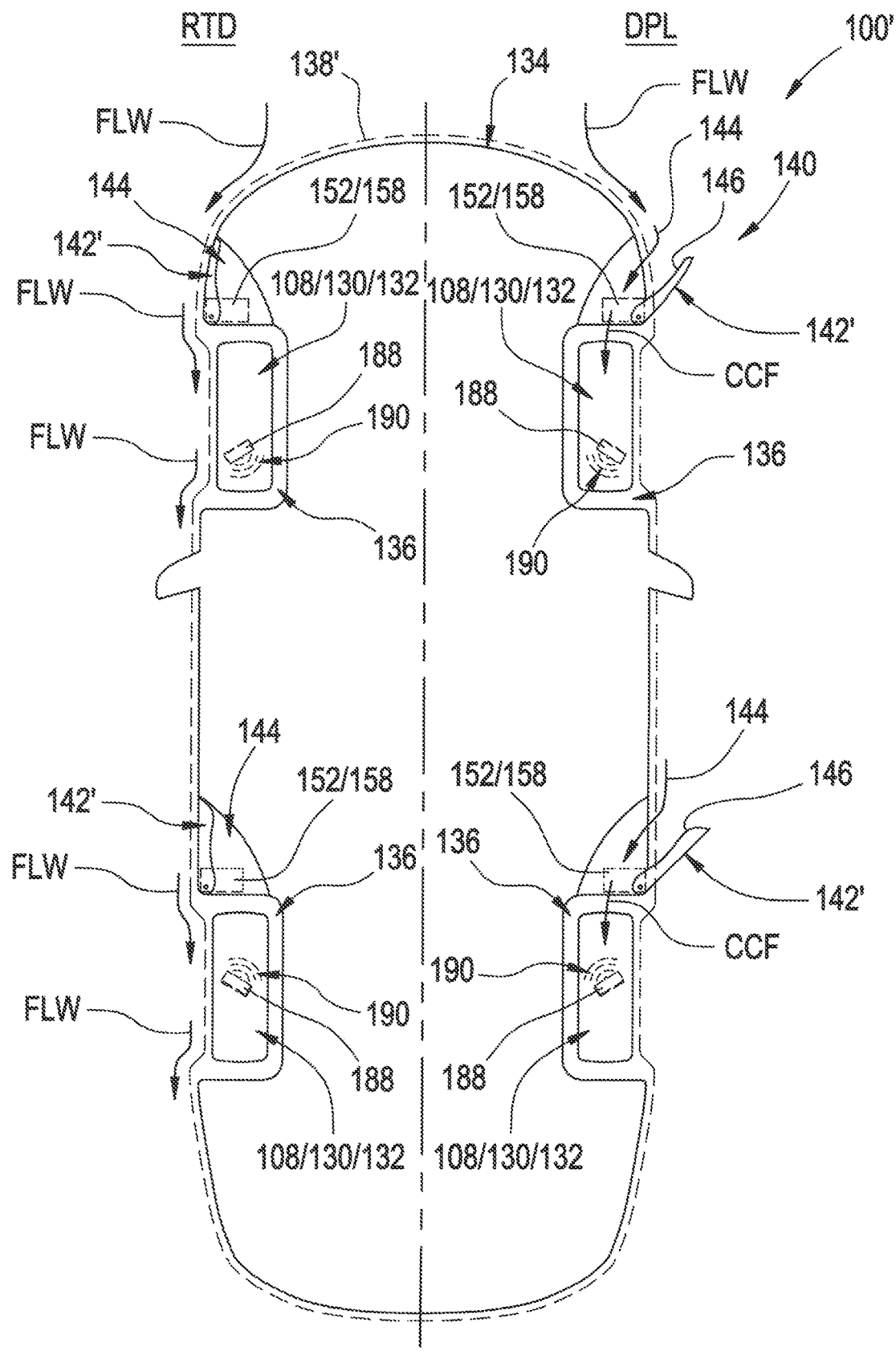
FIG. 4 is a greatly simplified schematic representation of another exemplary vehicle including a tire cooling system in accordance with the subject matter of the present disclosure that includes rotationally-operable actuators.

With reference to FIGS. 1-4, one example of a vehicle 100 that can include a tire cooling system in accordance with the subject matter of the present disclosure is shown in FIGS. 1-3 as taking the form of a tractor-trailer combination that includes an over-the-road tractor 102 and a trailer 104 that is operatively connected to the tractor for over-the-road transport. Another example of a vehicle 100' that can include a tire cooling system in accordance with the subject matter of the present disclosure is shown in FIG. 4 in the form of a passenger vehicle. It will be appreciated that the subject matter of the present disclosure is broadly applicable for use in connection with wheeled vehicles of any suitable type, kind, configuration and/or construction. As such, it is to be recognized and understood that the exemplary vehicles shown and describe herein (e.g., vehicles 100 and/or 100') are for purposes of illustration and explanation and that the same are not to be interpreted as limiting.

With respect to vehicle 100, tractor 102 is shown as including a frame 106 that is supported on a plurality of wheels 108 by a suspension system 110 that can include one or more axles 112 and/or one or more wheel-engaging members 114. Tractor 102 will typically also include a motor (not shown) and drivetrain (not shown) that are supported on the frame and provide motive power to one or more of wheels 108. Tractor 102 can include a fuel tank 116 and an exhaust stack 118 that are operatively associated with the engine. Tractor 102 can also include an operator compartment or cab 120 that can be supported on or along frame 106 in any suitable manner. Trailer 104 is shown as including a frame 122 that is supported on a plurality of wheels 124 by a trailer suspension system 126. Trailer 104 can also include a trailer body 128 that is at least partially supported on frame 122 and is generally dimensioned to receive and retain a quantity of cargo. It will be appreciated that wheels 108 and/or 124 are shown as having an otherwise conventional construction that includes a rim 130 and a pneumatic tire 132 installed in an inflated condition on rim 130. It will be appreciated that rims 130 and pneumatic tires 132 can be of any type, kind and/or configuration such as is well known and/or commonly used in connection with wheeled vehicles.

It will be appreciated that a tire cooling system in accordance with the subject matter of the present disclosure can be operatively associated with one or more wheels of vehicles of any suitable type, kind and/or configuration, such as heavy-duty vehicles (e.g., over-the-road tractor-trailer combinations, buses), medium duty vehicles (e.g., delivery trucks) and/or light-duty vehicles (e.g., passenger vehicles, pickup trucks). FIGS. 1-3 illustrate use of a tire cooling system in accordance with the subject matter of the present disclosure in connection with a heavy-duty vehicle (e.g., vehicle 100). Whereas FIG. 4 illustrates use of a tire cooling system in accordance with the subject matter of the present disclosure in connection with a light duty vehicle (e.g., vehicle 100'). It is to be recognized and understood, however, that the installations shown and described herein are merely exemplary and not to be interpreted as limiting.

With further reference to FIG. 4, vehicle 100' includes a vehicle body 134 that is supported on a plurality of wheels 108 by a suspension system. One or more of wheels 108 are operatively connected to a motor and drivetrain that provide motive power to the one or more wheels. Body 134 can include a plurality of wheel wells 136 within which one of wheels 108 is positioned.

It will be appreciated that vehicles, such as vehicles 100 and/or 100', for example, include an aerodynamic profile that is generally defined by the shape, configuration, position and/or orientation of the exterior components of the vehicle, such as is represented in FIGS. 2 and 3 by dashed lines 138 in connection with vehicle 100 and/or is represented in FIG. 4 by dashed lines 138' in connection with vehicle 100', for example. As non-limiting examples, exterior components of vehicles 100 and/or 100' that can at least partially respectively define aerodynamic profiles 138 and/or 138' can include a hood, front body panels or fenders, bumpers, windshield, roof, doors, side windows, rear window and rear body panels as well as components supported thereon or otherwise extending therefrom, such as mirrors, for example. It will be appreciated that such components are maintained in a fixed position relative to one another during use of the vehicle such that aerodynamic profiles 138 and/or 138' represent the physical components and structures along which air flows during movement of the vehicle, such as is represented in FIGS. 2-4 by airflow (or air flow) arrows FLW, for example. As such, airflows FLW follow a generally fixed and consistent path along aerodynamic profiles 138 and/or 138' unless deflected in accordance with the subject matter of the present disclosure, such as to generate additional convective cooling on or along wheels 108/124 and/or pneumatic tires 132 thereof.

In accordance with the subject matter of the present disclosure, vehicle 100 is shown in FIGS. 1-4 as including a tire cooling system 140 that is operatively associated with one or more wheels 108 and/or 124 of the vehicle. As non-limiting examples, in some cases, at least a portion of tire cooling system 140 can be disposed on or along tractor 102, such as is represented by reference number 140A in FIGS. 1-3, for example. Additionally, or in the alternative, at least a portion of tire cooling system 140 can be disposed on or along trailer 104, such as is represented in FIG. 1 by reference number 140B, for example. As such, it will be appreciated that a tire cooling system in accordance with the subject matter of the present disclosure can be operatively associated with any combination of any one or more wheels and/or tires of a vehicle and that any and all of such configurations find full support in the subject disclosure.

As illustrated in FIGS. 1-3, tire cooling system 140 includes at least one deflector panel 142 that is supported on vehicle 100 for displacement to, from and/or otherwise between a first (or retracted) position and a second (or deployed) position, such as is represented in FIGS. 2 and 3 by reference characters RTD and DPL, respectively. In the first or retracted position, deflector panels 142 are stationed within aerodynamic profile 138 such that air flows along vehicle 100 and across wheels 108/124 thereof in a manner represented by arrows FLW. In the second or deployed position, deflector panels 142 extend outwardly beyond profile 138 and into the stream(s) of air flowing along vehicle 100 as the vehicle moves through the external atmosphere during use in operation. In such a second or deployed position, deflector panels 142 deflect or otherwise redirect air flowing along vehicle 100 to flow over and/or across wheels 108/124 to increase convective cooling of pneumatic tires 132 thereof. Such deflected or otherwise redirected flow of air over and/or across wheels 108/124 to provide additional convective cooling is represented in FIGS. 2 and 3 by arrows CCF.

A similar arrangement is illustrated in FIG. 4 in which tire cooling system 140 is operatively associated with vehicle 100'. Tire cooling system 140 is shown in FIG. 4 as including deflector panels 142' operatively supported on or along vehicle body 134 in fluid communication with passages or channels 144 that are disposed adjacent wheel wells 136. Deflector panels 142' differ from deflector panels 142 in that in the retracted position, deflector panels 142 cover or otherwise obstruct flow through channels 144 such that airflow FLW follows the generally fixed and consistent path along aerodynamic profile 138' along or across wheels 108 within wheel wells 136. In the deployed position, deflector panels 142' extend outwardly beyond profile 138' and into the stream(s) of air flowing along vehicle 100' as the vehicle moves through the external atmosphere during use in operation. Additionally, in the deployed position, deflector panels 142' uncover or otherwise expose channels 144 such that air flowing along vehicle 100' is deflected or otherwise redirected into and through channels 144 thereby increasing the airflow over and/or across wheels 108/124 and pneumatic tires 132 thereof. In such a deployed position, the increased airflow increases convective cooling of pneumatic tires 132.

It will be appreciated that deflector panels 142 and/or 142' can be of any suitable size, shape, configuration and/or construction operative to redirect airflow along or across a single wheel and/or the pneumatic tire thereof, such as is illustrated in FIGS. 2-4, for example. In other cases, deflector panels 142 and/or 142' can be of a size, shape and/or configuration suitable for redirecting airflow along or across two or more wheels and/or the pneumatic tires thereof, such as is illustrated in FIGS. 2 and 3, for example. In some cases, deflector panels 142 and/or 142' can include a single deflective surface 146, such as is represented in FIG. 4 in connection with deflector panels 142', for example. In other cases, deflector panels 142 and/or 142' can include a plurality of deflective surfaces 148 that are spaced apart from one another and permit some amount of air to flow through the deflector panels while still redirecting the airflow toward tires 108/124, such as may aid in reducing the overall load and/or aerodynamic drag forces to which deflector panels 142 and/or 142' are subjected during use. It is to be appreciated and understood, however, that the foregoing are merely exemplary and that any combination of one or more deflective surfaces can be used in accordance with the subject matter of the present disclosure.

Deflector panels 142 and/or 142' can be operatively supported on or along vehicle 100 and/or 100' in any suitable manner. In some cases, deflector panels 142 and/or 142' can be actuated or otherwise displaced through linear translation to, from and/or otherwise between the first and second positions, such as is shown in FIGS. 1-3, for example. In such cases, tire cooling system 140 can include a linear actuator 150 operatively connected to one or more of deflector panels 142. In other cases, deflector panels 142 and/or 142' can be actuated or otherwise displaced through rotation to, from and/or otherwise between the first and second positions. In such cases, tire cooling system 140 can include a rotary actuator 152 operatively connected to one or more of the deflector panels. It will be appreciated, however, that other configurations and/or arrangements of actuators and/or other displacement devices operatively connected with deflector panels could alternately be used.

In some cases, tire cooling system 140 can, optionally, include one or more support members 154 operatively connected between deflector panels 142 and/or 142' and vehicle 100 and/or 100'. If included, support members 154 can provide structural support and/or rigidity to deflector panels 142 and/or 142' as the same translate linearly or rotationally between the first and second positions. Additionally, or in the alternative, tire cooling system 140 can include one or more biasing devices 156 operatively connected with deflector panels 142 and/or 142', such as to urge or bias the deflector panels toward the retracted position or the deployed position. If biasing devices 156 are included, actuators 150 and/or 152 can be operable to overcome the force applied by biasing devices 156 to thereby displace or otherwise move the deflector panel(s) from one of the deployed or retracted positions toward the other of the deployed or retracted positions with the return displacement or movement provided or at least assisted by biasing devices 156. Furthermore, or as a further alternative, tire cooling system 140 can include one or more locking devices 158 operatively associated with deflector panels 142 and/or 142'. If included, locking devices 158 can be operable to maintain the deflector panel(s) in a position (e.g., retracted position RTD, deployed position DPL) or otherwise substantially inhibit movement of the deflector panel(s). In some cases, locking devices 158 can be operatively associated with linear actuators 150 and/or rotary actuators 152.

It will be appreciated that deflector panels 142 and/or 142' can be displaced between retracted position RTD and deployed position DPL through any suitable manner of operative control of actuators 150 and/or 152 together with biasing devices 156 and/or locking devices 158, if included. In some cases, actuators 150 and/or 152 as well as locking devices 158, if included, can be operated using electrical power. That is, linear actuation can be provided through electrical operation of a rotational motor and lead screw and/or axial displacement of linear motor, for example. Whereas, rotational actuation can be provided through electrical operation of a rotational motor or other rotary actuator, for example.

In such case, tire cooling system 140 can include a controller or electronic control unit 160 that is capable of communication with any one or more systems and/or components of vehicle 100 and/or 100' such as for selective operation and/or control thereof. For example, controller 160 can be communicatively coupled with linear actuators 150 and/or rotary actuators 152 for selective operation thereof, such as through conductors or leads 162 as shown in FIG. 3, for example. By selectively actuating/deactivating or otherwise selectively operating the linear and/or rotary actuators, controller 160 can selectively control displacement of deflector panels 142 and/or 142' to, from and/or otherwise between retracted position RTD and deployed position DPL. If locking devices 158 are included, controller 160 can be communicatively coupled with the locking devices for selective operation and/or control thereof, such as through conductors or leads 164 as shown in FIG. 3, for example.

Additionally, or in the alternative, actuators 150 and/or 152 as well as locking devices 158, if included, can be operated using pneumatic or hydraulic power, such as is shown in FIG. 4, for example. That is, linear actuation can be provided through rotation of a pneumatic or hydraulic motor and/or axial displacement of pneumatic or hydraulic cylinders, such as through supply, exhaust and/or other transfer of pressurized fluid (e.g., gas and/or liquid) into, out of and/or otherwise through the pneumatic or hydraulic motors and/or the pneumatic or hydraulic cylinders, for example. Rotational actuation can be provided through rotation of pneumatic or hydraulic motors and/or other rotary actuators, such as through supply, exhaust and/or other transfer of pressurized fluid (e.g., gas and/or liquid) into, out of and/or otherwise through the pneumatic or hydraulic motors and/or other rotary actuators, for example.

In such cases, tire cooling system 140 can include pressurized fluid system 166 operatively coupled with actuators 150 and/or 152. Pressurized fluid system 166 can include a pressurized fluid source 168, such as a compressor, for example, for generating pressurized fluid, such as, hydraulic oil, air and/or other gases, for example. A control device 170, such as a valve assembly, for example, is shown as being in communication with pressurized fluid source 168 and can be of any suitable configuration or arrangement. In the exemplary embodiment shown, control device 170 can include a valve assembly with a valve block 172 and a plurality of valves 174 supported thereon. Control device 170 can also, optionally, include a suitable exhaust 176, such as a muffler, for example, for venting pressurized gas from the system. Pressurized fluid system 166 can also, optionally, include a reservoir 178, which is shown as being in fluid communication with the pressurized fluid source and/or the control device, and is suitable for storing pressurized fluid at an elevated pressure for an extended period of time, such as minutes, hours, days, weeks or months.

Control device 170 can be in fluid communication with linear actuators 150 and/or rotary actuators 152 for selective operation thereof in any suitable manner, such as through fluid transfer lines 180, for example. If locking devices 158 are included, control device 170 can be in fluid communication with the locking devices for selective operation and/or control thereof, such as through fluid transfer lines 182 as shown in FIG. 4, for example. By selectively transferring pressurized fluid to, from and/or otherwise between control device 170, actuators 150 and/or 152, and locking devices 158, if included, controller 160 can selectively control displacement of deflector panels 142 and/or 142' to, from and/or otherwise between retracted position RTD and deployed position DPL.

Regardless of the manner and/or system through which deflector panels 142 and/or 142' are displaced (e.g., electrically fluid pressure), tire cooling system 140 can be operated to selectively deploy and/or retract deflector panels 142 and/or 142' through the use of any suitable combination of internal and/or external inputs, trigger events and/or other signals. For example, tire cooling system can include a sensor communication device 184 that is communicatively coupled with controller 160, such as by way of conductor or lead 186, for example. Sensor communication device 184 is adapted for communicative coupling with one or more sensing devices 188 operatively associated with wheels 108/124 and/or pneumatic tires 132 thereof, such as through wireless communication as is represented in FIGS. 2-4 by electromagnetic waves 190, for example. Sensing devices 188 are operative to output or otherwise generate data, signals, information and/or other communications having a relation to any combination of any one or more physical characteristics of or otherwise associated with wheels 108/124 and/or pneumatic tires 132 thereof. As non-limiting examples, such one or more physical characteristics can include a temperature associated with wheels 108/124 and/or pneumatic tires 132 thereof, a pressure of gas within pneumatic tires 132 thereof (which can, in some cases, operate as a proxy for tire temperature), a force or load on wheels 108/124 and/or pneumatic tires 132 thereof, an estimated remaining useful life of one or more of pneumatic tires 132, and/or an estimated health condition of pneumatic tires 132, for example.

Tire cooling system 140 can also include a human-machine interface device 192 communicatively coupled with controller 160, such as by way of a conductor or lead 192C, for example. Interface device 192 can be of any suitable type or kind, such as an audible, visual and/or tactile communication device (e.g., touch-screen input device), for example, through which an associated user or vehicle operator can generate and/or receive data, signals, information and/or other communications relating to the performance and/or operation of tire cooling system 140. As non-limiting examples, such data, signals, information and/or communications can include indications as to the status and/or operation of the tire cooling system, position of deflector panels thereof (e.g., fully retracted, partially retracted, partially deployed, fully deployed), physical characteristics of one or more of the wheels and/or pneumatic tires of the vehicle (e.g., temperature, pressure, load, estimated remaining useful tire life, estimated tire health).

Controller 160 can include any suitable hardware, software and/or combination thereof for configuration and operation of a tire cooling system in accordance with the subject matter of the present disclosure. For example, controller 160 can include a processing device, which can be of any suitable type, kind and/or configuration, such as a microprocessor, for example, for processing data, executing software routines/programs, and other functions relating to the performance and/or operation of tire cooling system 140. Additionally, the controller can include a memory of any suitable type, kind and/or configuration that can be used to store software, parameters, settings, inputs, data, values and/or other information for use in association with the performance and/operation of tire cooling system 140. In the arrangement shown in FIG. 5, controller 160 includes a microprocessor 194 and a memory 196, which includes boxes 196A and 196B.

Figure 5:
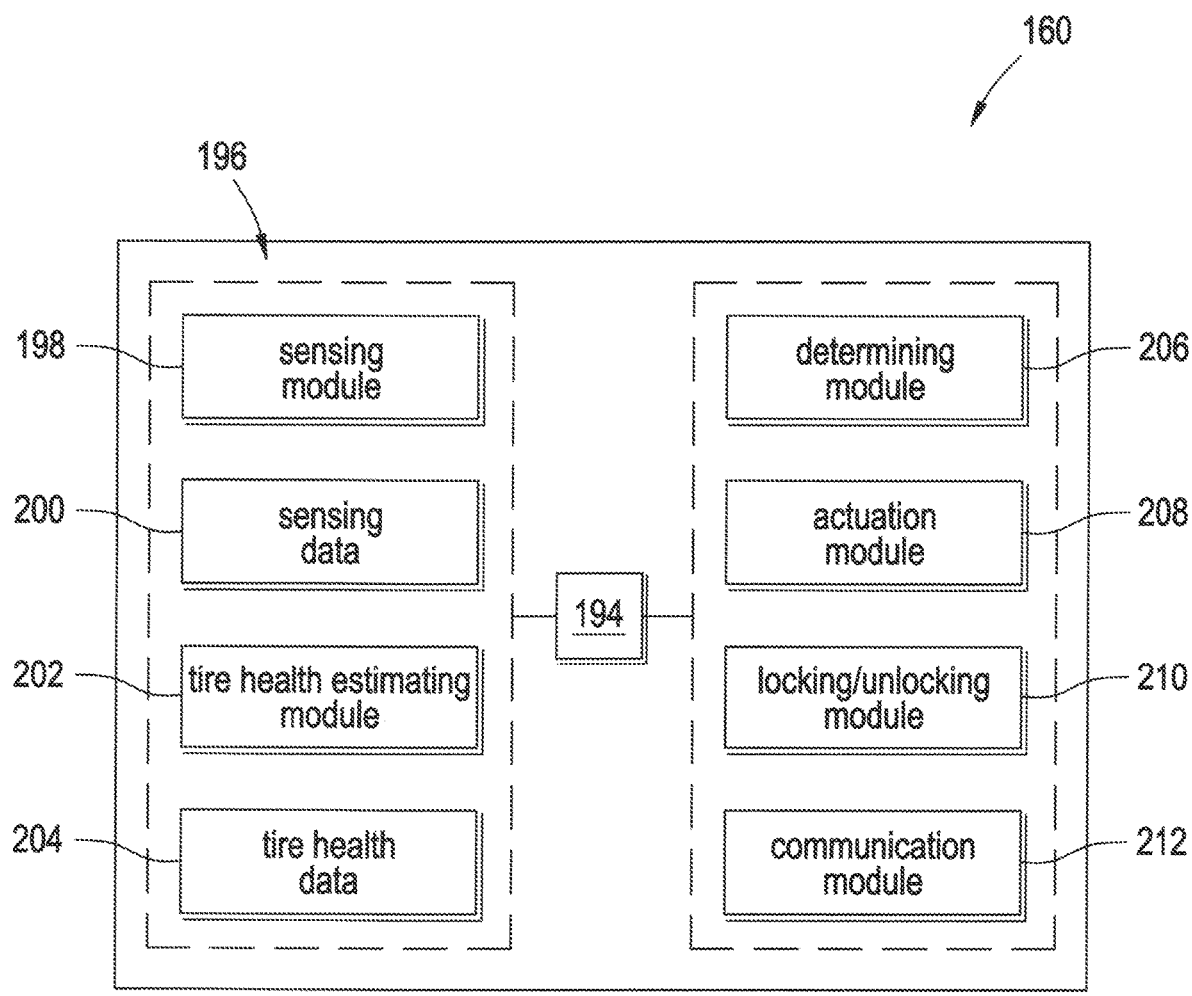
FIG. 5 is a schematic representation of one example of a controller for a tire cooling system in accordance with the subject matter of the present disclosure.

As shown in FIG. 5, controller 160 can include a sensing module 198 that is capable of requesting, receiving, processing, storing and/or otherwise transferring data, values, information, signals and/or communications into and/or out of sensor communication device 184 and/or sensing devices 188, such as may relate to or be associated with physical characteristics of wheels 108/124 and/or pneumatic tires 132 thereof. In some cases, sensing module 198 can request, receive, process and/or store data, values, information, signals and/or communications such as may relate to or be associated with physical characteristics of wheels 108/124 and/or pneumatic tires 132, which can be stored in memory 196, such as is represented by box 200 in FIG. 5, for example.

In some cases, controller 160 can, optionally, include a tire health estimating module 202 that is capable of requesting, receiving, processing, storing and/or otherwise transferring data, values, information, signals and/or communications into and/or out of tire cooling system 140, such as may relate to or be otherwise associated with estimating characteristics and/or properties of pneumatic tires 132. As a non-limiting example, tire health estimating module 202 could utilize a tire health model or algorithm to estimate the current physical condition and/or remaining useful life of one or more of pneumatic tires 132, such as may be at least partially based on historical conditions of use of a tire and/or estimated remaining tire life, for example. In some cases, tire health estimating module 202 can request, receive, process and/or store data, values, information, signals and/or communications from sensing module 198 and/or sensing data 200, such as may relate to or be associated with recent and/or current physical characteristics of wheels 108/124 and/or pneumatic tires 132. Additionally, or in the alternative, tire health estimating module 202 can request, receive, process and/or store data, values, information, signals and/or communications such as may relate to or be associated with historical conditions of use of one or more of pneumatic tires 132, which can be stored in memory 196, such as is represented by box 204 in FIG. 5, for example. It will be appreciated that tire health estimating module 202 can utilize any combination of data, values, information, signals and/or communications from any one or more of sensing module 198, sensing data 200, and/or tire heath data 204.

Controller 160 can include a determining module 206 that is capable of requesting, receiving, processing, storing and/or otherwise transferring data, values, information, signals and/or communications into and/or out of tire cooling system 140, such as may relate to or be associated with the identification and/or determination of conditions under which displacement of deflector panels 142 and/or 142' to, from and/or otherwise between retracted position RTD and deployed position DPL should be performed or otherwise completed. As non-limiting examples, determining module 206 could request, receive, process and/or store data, values, information, signals and/or communications from sensing module 198, sensing data 200, tire health estimating module 202 and/or tire health data 204 relating to or otherwise associated with current and/or historical physical characteristics and/or conditions of one or more of wheels 108/124 and/or one or more of pneumatic tires 132. As non-limiting examples, determining module 206 could be operative to identify or otherwise determine conditions under which a temperature of one or more of wheels 108/124 and/or pneumatic tires 132 exceeds a predetermined temperature threshold, a pressure of one or more of pneumatic tires 132 is less than a predetermined pressure threshold, a force or load on one or more of wheels 108/124 and/or pneumatic tires 132 exceeds a predetermined load threshold, and/or one or more of pneumatic tires 132 may exceed an estimated useful life thereof prior to reaching a target destination of the associated vehicle. For illustrative purposes and as a non-limiting example, determining module 206 could be operative to determine that a given tire is currently operating at or below a predetermined tire threshold temperature but that additional convective cooling would be beneficial due to extensive prior use at elevated temperatures. Additionally, determining module 206 can be capable of processing, generating, communicating and/or otherwise transferring data, values, information, signals and/or communications into and/or out of tire cooling system 140, such as may be associated with triggering displacement of deflector panels 142 and/or 142' to, from and/or otherwise between retracted position RTD and deployed position DPL.

Controller 160 can include an actuation module 208 that is capable of requesting, receiving, processing, storing, generating, communicating and/or otherwise transferring data, values, information, signals and/or communications into and/or out of tire cooling system 140, such as may relate to or be associated with the actuation and/or other displacement of deflector panels 142 and/or 142' to, from and/or otherwise between retracted position RTD and deployed position DPL. As non-limiting examples, actuation module 208 could be operative to process, generate, communicate and/or otherwise transfer data, values, information, signals and/or communications to and/or from linear actuators 150, rotary actuators 152 and/or control device 170 for selectively operation thereof, such as to displace deflector panels 142 and/or 142' to, from and/or otherwise between retracted position RTD and deployed position DPL.

Controller 160 can include a locking/unlocking module 210 that is capable of requesting, receiving, processing, storing, generating, communicating and/or otherwise transferring data, values, information, signals and/or communications into and/or out of tire cooling system 140, such as may relate to or be associated with the actuation and/or other displacement of deflector panels 142 and/or 142' to, from and/or otherwise between retracted position RTD and deployed position DPL. As a non-limiting example, locking/unlocking module 210 could be operative to process, generate, communicate and/or otherwise transfer data, values, information, signals and/or communications to and/or from locking devices 158 and/or control device 170 for selective operation thereof, such as to displace locking devices 158 to, from and/or otherwise between locked conditions in which movement of the deflector panels is substantially inhibited and unlocked conditions in which the deflector panels can be moved, such as by actuators 150 and/or 152, for example.

Controller 160 can include a communication module 212 that is capable of requesting, receiving, processing, storing, generating, communicating and/or otherwise transferring data, values, information, signals and/or communications to and/or from an associated user, vehicle operator and/or other system, such as through interface device 192, for example. As non-limiting examples, communication module 212 can be operable to display, audibly indicate and/or otherwise communicate indications to and/or from an associated user, vehicle operator and/or other system as to the status and/or operation of the tire cooling system, position of deflector panels thereof (e.g., fully retracted, partially retracted, partially deployed, fully deployed), current and/or historical physical characteristics and/or conditions of one or more of the wheels and/or pneumatic tires of the vehicle (e.g., temperature, pressure, load, estimated remaining useful tire life, estimated tire health).

It will be appreciated that the one or more modules of controller 160, which are shown and described herein as modules 198, 202 and 206-212, can be provided in any suitable manner, such as software, hardware and/or a combination of hardware and software, for example. In some cases, modules 198, 202 and 206-212 can take the form of algorithms, routines and/or programs. If provided in whole or in part as software, the configuration and operation modules of controller 160 can be provided and stored in any suitable manner or arrangement. For example, all of the algorithms, routines and/or programs could be integrated into a single software program in which separate sections or portions of the software code will perform the various actions and/or activities of the system. In another embodiment, two or more independent modules (e.g., algorithms, routines and/or programs) could be used to perform the various actions and/or activities of the system.

Furthermore, memory 196 can store or otherwise retain any suitable data, values, settings, software, algorithms, routines, programs and/or any other information, in any suitable manner or form. And, in a preferred arrangement, microprocessor 194 can be in communication with memory 196 and can be operative to selectively access and/or process one or more of data, values, information, algorithms, routines and/or programs, such as those retained in memory stores 198-212, for example, alone or in combination. For example, microprocessor 196 can run or otherwise process an algorithm, routine or program, such as from one or more of memory locations modules 198, 202 and 206-212 that is operative to access, analyze or otherwise utilize data and/or information, such as may be stored in memory locations 200 and/or 204, for example.

Figure 6:
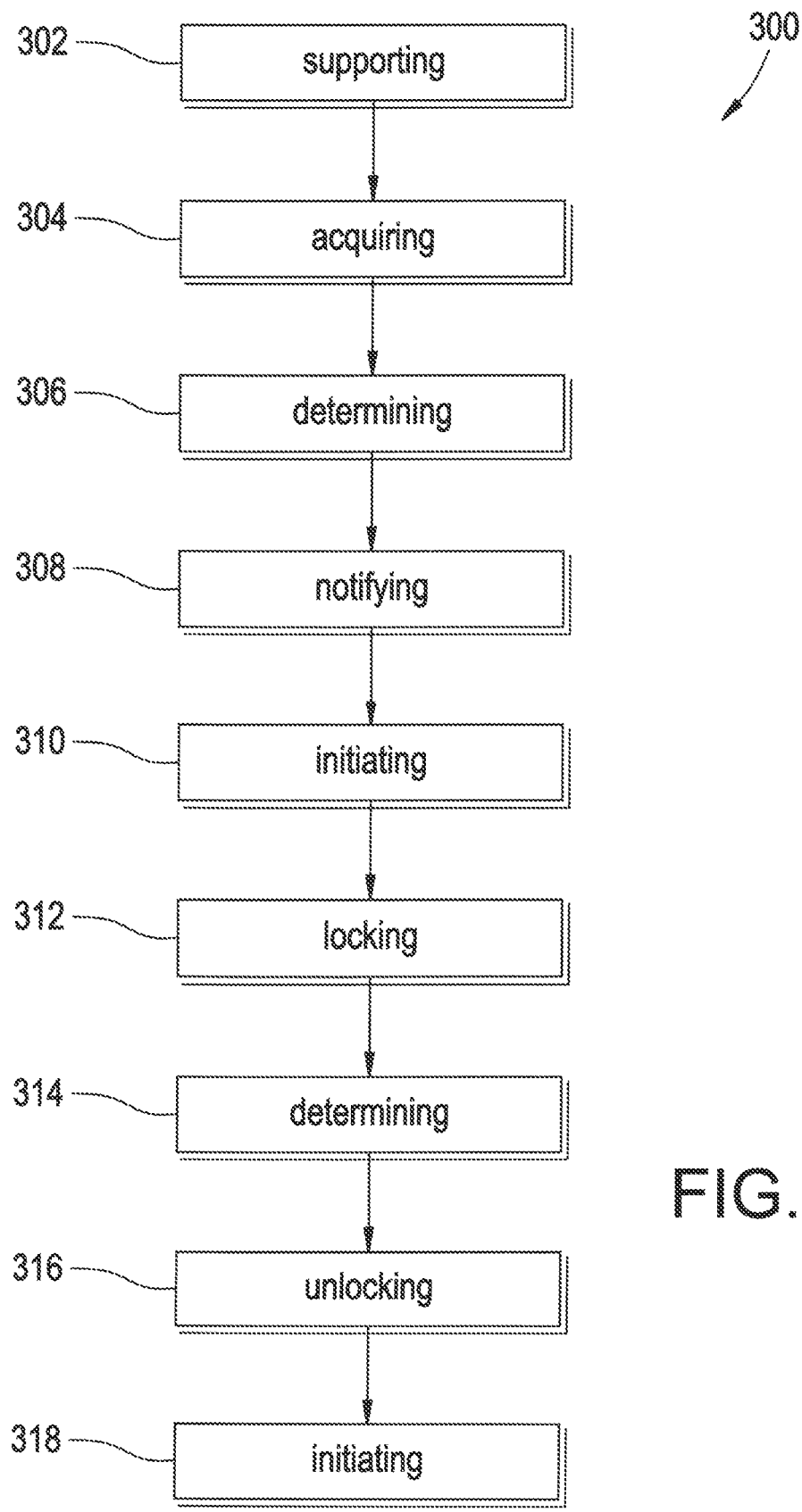
FIG. 6 is a graphical representation of one example of a method in accordance with the subject matter of the present disclosure.

A method 300 of operating a convective tire cooling system (e.g., tire cooling system 140) in accordance with the subject matter of the present disclosure in connection with a wheeled vehicle (e.g., vehicles 100 and/or 100') is shown in FIG. 6 and can include supporting a deflector panel (e.g., deflector panels 142 and/or 142') on a vehicle adjacent a wheel or pneumatic tire for displacement between retracted and deployed positions, as is represented by reference number 302. Method 300 can also include acquiring data having a relation to a physical characteristic of the wheel or pneumatic tire and/or data having a relation to estimated remaining useful life and/or estimated health condition of the pneumatic tire, as is indicated by reference number 304, for example. Method 300 can further include determining that the data is greater than or less than a predetermined threshold value (e.g., tire temperature, tire pressure and/or tire load is greater than predetermined threshold value) and/or exceeds a predetermined metric or model relative to remaining useful life and/or estimated health condition of the pneumatic tire, as indicated by reference number 306, for example. Method 300 can optionally include notifying a vehicle operator or other party or computer system of the determination that the data is greater than or less than the predetermined threshold value and/or exceeds the predetermined metric or model relative to remaining useful life and/or estimated health condition of the pneumatic tire, as is represented in FIG. 6 by reference number 308. Method 300 also includes initiating displacement of the deflector panel from one of the retracted and deployed positions toward the other of the retracted and deployed positions, as indicated by reference number 310. The method can, optionally, include locking the deflector panel in position, as indicated by reference number 312. Method 300 can, optionally, further include determining that data having a relation to the physical characteristic of the wheel or pneumatic tire is reduced below or increased above the predetermined threshold value (e.g., tire temperature has been reduced below the predetermined threshold value), as indicated by reference number 314. Method 300 can, optionally, include unlocking the deflector panel, as indicated by reference number 316. The method can also include initiating displacement of the deflector panel from one of the retracted and deployed positions toward the other of the retracted and deployed positions, as indicated by reference number 318.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

It is to be recognized and appreciated that terms such as "can", "may", "might" and the like are to be interpreted as being permissive rather than required. As such, any reference to items with which terms such as "can", "may", "might" and the like are used shall be interpreted as being optional rather than required by the subject matter of the present disclosure unless otherwise specifically set forth herein.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A vehicle comprising:
a vehicle body including a wheel well with an aerodynamic profile extending along said vehicle body and across said wheel well;
a wheel including a tire dimensioned to engage a ground surface, said wheel disposed within said wheel well of said vehicle body and inside said aerodynamic profile such that a first nominal volume of air flows along said wheel during movement of said vehicle at a given rate of travel;
a deflector panel disposed along said vehicle body adjacent said wheel well, said deflector panel displaceable between:
a first position in which said deflector panel is substantially-entirely disposed within said aerodynamic profile of said vehicle body with said first nominal volume of air flowing along said wheel during movement of said vehicle at said given rate of travel; and,
a second position in which said deflector panel projects outwardly beyond said aerodynamic profile of said vehicle body such that a second nominal volume of air that is greater than said first nominal volume of air flows along said wheel during movement of said vehicle at said given rate of travel thereby increasing convective heat transfer from said tire.

2. A vehicle according to claim 1 further comprising an actuator operatively connected to said deflector panel and operable to displace said deflector panel between said first and second positions.

3. A vehicle according to claim 1 further comprising a lock displaceable between a first operative condition and a second operative condition such that:
in said first operative condition of said lock, said deflector panel is displaceable between said first and second positions; and,
in said second operative condition of said lock, said deflector panel is retained in one of said first and second positions and displacement to the other of said first and second positions is inhibited by said lock.

4. A vehicle according to claim 1 further comprising a biasing device operatively engaged with said deflector panel such that said deflector panel is urged toward one of said first and second positions.

5. A vehicle according to claim 1 further comprising a sensor configured to register data having a relation to a temperature of said tire, an air pressure of said tire, a load supported by said tire and/or an estimated remaining useful life of said tire.

6. A vehicle according to claim 1 further comprising:
a first sensor configured to register data having a relation to a physical characteristic of said tire; and,
a processor communicatively coupled with a memory and said first sensor, said memory including instructions to:
determine, based at least in part on said data, that said physical characteristic of said tire is one of a) equal to or greater than a first threshold value and b) less than said first threshold value; and,
initiate displacement of said deflector panel from said first position to said second position thereby increasing airflow along said wheel from said first nominal volume of air flow to said second nominal volume of air flow.

7. A vehicle according to claim 6, wherein said memory includes instructions to determine, based at least in part on said data, that said physical characteristic of said tire is the other of a) equal to or greater than said first threshold value and b) less than said first threshold value.

8. A vehicle according to claim 7, wherein said memory includes instructions to initiate displacement of said deflector panel from said second position to said first position upon determining that said physical characteristic of said tire is the other of a) equal to or greater than said first threshold value and b) less than said first threshold value.

9. A vehicle according to claim 7, wherein said memory includes instructions to determine, based at least in part on said data, that said physical characteristic of said tire is one of a) less than a second threshold value that is less than said first threshold value and b) equal to or greater than a second threshold value that is greater than said first threshold value.

10. A vehicle according to claim 9, wherein said memory includes instructions to initiate displacement of said deflector panel from said second position to said first position upon determining that said physical characteristic of said tire is said one of a) less than said second threshold value and b) equal to or greater than said second threshold value.

11. A vehicle according to claim 6 further comprising an actuator operatively connected to said deflector panel and operable to displace said deflector panel between said first and second positions.

12. A vehicle according to claim 11, wherein said processor is communicatively coupled to said actuator, and said instruction to initiate displacement of said deflector panel from said first position to said second position includes instructions to initiate operation of said actuator.

13. A vehicle according to claim 11, wherein said memory includes instructions to suspend operation of said actuator.

14. A vehicle according to claim 6 further comprising a lock displaceable between a first operative condition in which said deflector panel is displaceable between said first and second positions and a second operative condition in which said deflector panel is retained in one of said first and second positions and displacement to the other of said first and second positions is inhibited by said lock, and said memory includes instructions to initiate operation of said lock and suspend operation of said lock.

15. A vehicle according to claim 6 further comprising a human-machine interface device communicatively coupled with said processor, and said memory includes instructions to initiate a warning to an associated vehicle operator through said human-machine interface device that said physical characteristic of said tire is one of a) equal to or greater than said first threshold value and b) less than said first threshold value.

16. A vehicle according to claim 6, wherein said physical characteristic includes any one or more of a temperature of said tire, an air pressure of said tire, a load supported by said tire, and/or an estimated remaining useful life of said tire.

17. A tire cooling system operatively disposed along an associated vehicle body adjacent an associated vehicle tire, said tire cooling system comprising:
- a deflector panel displaceable between a first position in which a first nominal volume of air flows along the associated vehicle tire during movement of the associated vehicle at a given rate of travel and a second position in which a second nominal volume of air that is greater than said first nominal volume of air is directed along the associated vehicle tire during movement of the associated vehicle at said given rate of travel;
- an actuator operatively connected to said deflector panel and operable to displace said deflector panel between said first and second positions;
- a first sensor configured to register data having a relation to a physical characteristic of the associated vehicle tire; and,
- a processor communicatively coupled with a memory, said actuator and said first sensor, said memory including instructions to:
  - determine, based at least in part on said data, that said physical characteristic of the associated vehicle tire is one of a) equal to or greater than a first threshold value and b) less than said first threshold value; and,
  - initiate displacement of said deflector panel from said first position to said second position thereby increasing air flow along the associated vehicle tire from said first nominal volume of air flow to said second nominal volume of air flow thereby generating a corresponding increase in convective heat transfer from the associated vehicle tire.

18. A tire cooling system according to claim 17, wherein said memory includes instructions to determine, based at least in part on said data, that said physical characteristic of the associated vehicle tire is the other of a) equal to or greater than said first threshold value and b) less than said first threshold value.

19. A tire cooling system according to claim 17, wherein said memory includes instructions to determine, based at least in part on said data, that said physical characteristic of the associated vehicle tire is one of a) less than a second threshold value that is less than said first threshold value and b) equal to or greater than a second threshold value that is greater than said first threshold value.

20. A method of cooling a tire of a vehicle that includes a vehicle body and a wheel with the tire, the vehicle body including a wheel well and an aerodynamic profile extending along the vehicle body and across the wheel well, the wheel disposed within the wheel well of the vehicle body and inside the aerodynamic profile such that a first nominal volume of air flows along the wheel during movement of the vehicle at a given rate of travel, said method comprising:
- supporting a deflector panel on the vehicle body adjacent the wheel well such that said deflector panel is displaceable between a first position in which said deflector panel is substantially-entirely disposed within the aerodynamic profile of the vehicle body with the first nominal volume of air flowing along the wheel during movement of the vehicle at the given rate of travel and a second position in which said deflector panel projects outwardly beyond the aerodynamic profile of the vehicle body such that a second nominal volume of air that is greater than the first nominal volume of air flows along the wheel during movement of the vehicle at the given rate of travel;
- acquiring data having a relation to a physical characteristic of the tire;
- determining, based at least in part on said data, that said physical characteristic of the tire is one of a) equal to or greater than a first threshold value and b) less than said first threshold value; and,
- initiating displacement of said deflector panel from said first position to said second position thereby increasing airflow along the wheel from the first nominal volume of air flow to the second nominal volume of air flow and generating a corresponding increase in convective heat transfer from the tire.

* * * * *